3,317,517
PROCESS FOR THE PREPARATION OF EPSILON-CAPROLACTAM
Akira Mifune, Sachio Ishimoto, Osamu Ikeda, and Hideo Matsui, all of Iwakuni-shi, Yamaguchi-ken, Japan, assignors to Teijin Limited, Osaka, Japan, a corporation of Japan
No Drawing. Filed Feb. 27, 1964, Ser. No. 347,709
Claims priority, application Japan, Mar. 7, 1963, 38/10,442; Apr. 20, 1963, 38/20,060; Feb. 11, 1964, 39/6,938
8 Claims. (Cl. 260—239.3)

This invention relates to a novel process for the preparation of epsilon-caprolactam. More particularly, the invention relates to a novel process for the preparation of epsilon-caprolactam by heating epsilon-caprolactone or epsilon-hydroxycaproamide or amide-forming derivatives of epsilon-hydroxycaproic acid in aqueous ammonia, under hydrogen or hydrogen-containing gaseous atmosphere.

Heretofore as the processes for the production of epsilon-caprolactam, that by Beckmann's rearrangement of cyclohexanoneoxime and that of acting upon a cyclohexyl compound, for example, cyclohexane carboxylic acid, with a nitrosation agent and oleum are known. However in these processes always large amounts of ammonium sulfate is by-produced and the disposal thereof provides an industrial drawback.

As one of the methods to overcome this drawback, there is proposed a process wherein epsilon-caprolactone is reacted with ammonia to produce epsilon-caprolactam which hereinafter shall be referred to as lactam. For example, according to the process disclosed in U.S. Patent No. 3,000,880, epsilon-caprolactone and aqueous ammonia are reacted to form lactam at one pass yield of about 50%, the reaction temperatures employed therein being of very high range as from the critical temperature of water to plus 100° C. thereto. Again according to the process of U.S. Patent No. 3,000,879, a 25% aqueous solution of epsilon-hydroxycaproamide is heated to 350° C. in a closed vessel to form lactam at one pass yield of about 30%, the reaction temperatures employed being 300–475° C., preferably 350–425° C.

Therefore in these known processes, objectionable side-reaction such as polymerization and/or thermal decomposition of the starting material, intermediates and the product lactam take place, and the obtained lactams are remarkably colored and inferior in quality.

Other known processes comprise reacting ε-caprolactone with liquid ammonia in solvents other than water to obtain epsilon-caprolactam. However such processes are hardly industrially advantageous in that the recovery steps of the solvents used are required. Further a process of reacting ε-caprolactone with liquid ammonia without using any solvent is also known, which however yields only very small amount of lactam but the greater part of the product is polyamides formed with epsilon-hydroxycaproamide and epsilon-aminocaproamide. Thus, this process is not preferred as the one for the production of lactam.

We carried out extensive researches to eliminate the above-described deficiencies and reached the subject invention.

In accordance with the invention, it is found possible to produce with ease lactam of little coloration by heating epsilon-caprolactone, epsilon-hydroxycaproamide, or amide-forming derivatives of epsilon-hydroxycaproic acid in aqueous ammonia under hydrogen or hydrogen-containing gaseous atmosphere, to 200–420° C., preferably 250–390° C.

The characteristic feature of this invention resides in that by carrying out the above-described reaction under hydrogen or hydrogen-containing gaseous atmosphere, lactam of remarkably less coloration compared with the products of the known prior methods can be prepared, furthermore at a greater reaction rate.

The invention now will be explained in detail hereinbelow.

In the invention, as the starting material amide-forming derivatives of epsilon-hydroxycaproic acid may also be used as well as epsilon-caprolactone and epsilon-hydroxycaproamide. The said amide-forming derivatives include, for example:

(a) Lower alkyl esters of epsilon-hydroxycaproic acid, such as methyl-, ethyl-, propyl-esters thereof, (b) Cycloalkyl esters of epsilon-hydroxycaproic acid, such as cyclohexyl ester thereof, (c) Aralkyl esters of epsilon-hydroxycaproic acid, such as benzyl ester thereof, (d) Aryl esters of epsilon-hydroxycaproic acid, such as phenyl ester thereof, (e) Ammonium salt of epsilon-hydroxycaproic acid and alkali metal salts thereof, such as sodium and potassium salts thereof, and (f) Acid halides such as chloride, bromide and iodide of epsilon-hydroxycaproic acid.

These amide-forming derivatives are readily converted to epsilon-hydroxycaproamide, reacting with ammonia or aqueous ammonia. Therefore, all of these compounds can be used as the starting material of the invention as well as epsilon-caprolactone and epsilon-hydroxycaproamide.

In the invention the starting material as above is heated in aqueous ammonia, said heating being performed under hydrogen or hydrogen-containing gaseous atmosphere. The partial pressure of hydrogen in that case is not necessarily critical, however it is economically advantageous to use partial pressure of hydrogen ranging 0.01–100 atmospheres.

As the hydrogen-containing gas, gaseous mixture of hydrogen with other inert gases such as nitrogen and helium can be used. In practicing the invention the air inside the pressure vessel may be substituted by ammonia gas in advance, and thereafter hydrogen or hydrogen-containing gas may be supplied thereinto.

In the process of the invention, the preferred mol ratio between the aforesaid starting material and aqueous ammonia (in terms of pure ammonia) to be fed into the reaction system is 1–25, particularly 2–15, of the latter to 1 of the former. In that case the preferred concentration of the aqueous ammonia ranges 0.1–35% by weight, particularly 8–28% by weight, which however is not necessarily critical to the invention.

The reaction time varies depending on the reaction conditions. However, since if the reaction is continued too long the yield tends to be lowered because of the side reactions such as decomposition, generally it is desirable to select suitable reaction time within the range of 15 minutes to 15 hours.

In accordance with the invention the reaction progresses sufficiently rapidly in the absence of catalyst, however, particularly in the presence of any one or combination of noble metal-containing hydrogenation catalysts, nickel-containing hydrogenation catalysts and cobalt-containing hydrogenation catalysts, the advantages of the invention are manifested to the maximum, and the main lactam-forming reaction can be selectively promoted.

The reaction of the invention is performed in a pressure vessel under the autogenous pressure of the reaction mixture. The manner of operation may be either in batch system or continuous system, and a part or whole of the reactants and/or catalyst (if used) may be recycled. The hydrogen or hydrogen-containing gas again may be used repeatedly any number of times as desired.

Thus according to the invention, aqueous ammonia solution of crude lactam is obtained. For separation and recovery of lactam therefrom, optionally such means as solvent-extraction and vacuum distillation may be employed. However, since the reaction liquid still contains a large amount of water-soluble intermediates convertible to lactam, it is preferred to recover lactam therefrom by solvent-extraction followed by distillation. As the solvent, any of conventional lactam-extracting solvents such as hydrocarbons including, for example, benzene, toluene and cyclohexane; and halogenated hydrocarbons such as chloroform and carbon tetrachloride may be used. By such means it is made possible to recycle the solution remaining after the extraction to the reaction of this invention.

In case the catalyst is used, it may be removed at any stage before or after the solvent-extraction step.

As described in detail in the foregoing, in accordance with the invention a pressure vessel is employed, and the aforesaid starting material in aqueous ammonia is heated under hydrogen or hydrogen-containing gaseous atmosphere to 200–420° C., preferably 250–390° C., whereby the progress of undesirable side reactions is inhibited compared with the case not using hydrogen or hydrogen-containing gas, and as the result high quality lactam of little coloration, i.e. little impurity content, is obtained.

Again in accordance with the invention by the use of hydrogen or hydrogen-containing gas, the reaction rate can be increased. Normally the higher the reaction temperature is, the greater is the reaction rate. However in the invention by the use of hydrogen or hydrogen-containing gas, at the relatively low temperatures as those for this type of reaction, such as 250°–350° C., still the reaction progresses at a satisfactory rate. This is very advantageous from the standpoint of equipment facilities and ease of operation, and makes the process industrially highly attractive. On the other hand, also in the reactions at higher temperatures as 350° C. or more according to the invention the side reactions are effectively inhibited and the resultant crude lactam shows little coloration and has high quality. Therefore subsequent refining operations of the same are rendered easy.

*Example 1.*—A SUS-32 stainless steel autoclave (300 cc.) fitted with magnetic stirrer was charged with 22.8 g. of epsilon-caprolactone, 122 g. of 14% aqueous ammonia (lactone to ammonia in terms of mol ratio=1:5), and its inside atmosphere was substituted by hydrogen. The content was thereupon heated and stirred. After 5 hours of the reaction at 290° C., the heating and stirring were stopped, and the autoclave was left to cool off. After cooling, the reaction liquid was taken out and extracted with chloroform. The chloroform solution was then distilled to distill the chloroform off, yielding 6.9 g. of crude lactam. This corresponds to a one pass yield of 30.5%.

Thus obtained lactam was hardly colored.

*Example 2.*—A similar autoclave as used in Example 1 was charged with 22.8 g. of epsilon-caprolactone, 122 g. of 14% aqueous ammonia (lactone to ammonia in terms of mol ratio=1:5) and 1.0 g. (4.4% by weight based on the lactone) of Raney-nickel prepared in accordance with W-5 method. After substitution of the atmosphere with hydrogen, hydrogen was further introduced thereinto until its pressure reached 20 kg./cm.$^2$, and the content was heated and stirred. The reaction was continued for 5 hours at 275° C., and followed by the separation steps analogous to those in Example 1, 11.5 g. of crude lactam was obtained. This corresponds to a one pass yield of 50.9%. Thus obtained lactam was substantially free from colors.

*Example 3.*—A similar autoclave as used in Example 1 was charged with 11.4 g. of epsilon-caprolactone and 61 g. of 28% aqueous ammonia (lactone to ammonia in terms of mol ratio=1:10). After substitution of the atmosphere with hydrogen, hydrogen was further introduced thereinto until the pressure reached 10 kg./cm.$^2$, the reactants were heated and stirred. The reaction was continued for 3 hours at 340° C. In the similar manner as in Example 1, 4.2 g. of crude lactam was obtained from the reaction liquid. This corresponds to a one pass yield of 37.1%.

*Control 1.*—A similar autoclave as used in Example 1 was charged with 22.8 g. of epsilon-caprolactone and 122 g. of 14% aqueous ammonia (lactone to ammonia in terms of mol ratio=1:5). After substitution of the atmosphere with nitrogen, the content was heated and stirred. The reaction was continued for 5 hours at 290° C., followed by the separation steps similar to those in Example 1. 3.3 g. of crude lactam was obtained, corresponding to a one pass yield of 14.6%. Thus obtained lactam was colored deep brown.

*Example 4.*—A similar autoclave as used in Example 1 was charged with 13.1 g. of epsilon-hydroxycaproamide and 122 g. of 14% aqueous ammonia (epsilon-hydroxycaproamide to ammonia in terms of mol ratio=1:10). After substitution of the atmosphere with hydrogen, the content was heated and stirred. The reaction was continued for 5 hours at 275° C., and from the reaction liquid 1.9 g. of crude lactam was recovered by the separation steps similar to those in Example 1. This corresponds to a one pass yield of 16.8%.

Thus obtained lactam was substantially free from colors.

*Example 5.*—A similar autoclave as used in Example 1 was charged with 13.1 g. of epsilon-hydroxycaproamide, 122 g. of 14% aqueous ammonia (epsilon-hydroxycaproamide to ammonia in terms of mol ratio=1:10) and 3.9 g. (29.8% by weight based on the epsilon-hydroxycaproamide) of Raney-nickel prepared in accordance with W-5 method. After substitution of the atmosphere with hydrogen, hydrogen was further supplied thereinto until the pressure reached 20 kg./cm.$^2$, and the content was heated and stirred. The reaction pressure was 95 kg./cm.$^2$. The reaction was continued for 5 hours at 275° C., and from the reaction liquid 4.3 g. of crude lactam was obtained by the separation steps similar to those in Example 1. This corresponds to a one pass yield of 38.1%. The resultant lactam was substantially free from colors.

*Example 6.*—A similar autoclave as used in Example 1 was charged with 13.1 g. of epsilon-hydroxycaproamide, 122 g. of 14% aqueous ammonia (epsilon-hydroxycaproamide to ammonia in terms of mol ratio=1:5) and 0.5 g. (3.8% by weight based on the epsilon-hydroxycaproamide) of Raney-nickel prepared in accordance with W-5 method. After substitution of the atmosphere with hydrogen, hydrogen was further supplied thereinto until the pressure reached 10 kg./cm.$^2$, and the content was heated and stirred. The reaction was continued for 5 hours at 275° C., and from the reaction liquid 2.9 g. of crude lactam was obtained in the similar manner as in Example 1. This corresponds to a one pass yield of 25.7%.

*Example 7.*—A similar autoclave as used in Example 1 was charged with 13.1 g. of epsilon-hydroxycaproamide, 170 g. of 10% aqueous ammonia (epsilon-hydroxycaproamide to ammonia in terms of mol ratio=1:10) and 2.6 g. of Pd on C catalyst (metal content, 5% by weight; amount of the metal based on the epsilon-hydroxycaproamide, 1.0% by weight). After substitution of the atmosphere with hydrogen, hydrogen was further introduced into the autoclave until the inside pressure reached 10 kg./cm.$^2$, and the content was heated and stirred. The reaction was continued for 3 hours at 290° C., and from the resultant reaction liquid 3.5 g. of crude lactam was obtained in the similar manner as in Example 1.

This corresponds to a one pass yield of 31.0%. The lactam obtained was substantially free from colors.

*Control 2.*—A similar autoclave as used in Example 1 was charged with 13.1 g. of epsilon-hydroxycaproamide and 122 g. of 14% aqueous ammonia (epsilon-hydroxycaproamide to ammonia in terms of mol ratio=1:10), and its atmosphere was substituted by nitrogen followed by heating and stirring of the content. After 5 hours of the reaction at 275° C., 0.7 g. of crude lactam was recovered from the reaction liquid in the similar manner as in Example 1. This corresponds to a one pass yield of 6.2%. The resultant lactam was colored brown.

*Example 8.*—A similar autoclave as used in Example 1 was charged with 29.2 g. of methyl epsilon-hydroxycaproate, 61.2 g. of 27.8% aqueous ammonia (methyl epsilon-hydroxycaproate to ammonia in terms of mol ratio=1:5) and 63.8 g. of pure water, and its atmosphere was substituted by hydrogen, followed by heating and stirring of the content. After 5 hours of the reaction at 300° C., 4.8 g. of crude lactam was recovered from the reaction liquid in the similar manner as in Example 1. This corresponds to a one pass yield of 21.3%. The resultant lactam was substantially free from colors.

*Example 9.*—A similar autoclave as used in Example 1 was charged with 9.0 g. of ammonium epsilon-hydroxycaproate, 20.0 g. of 25.9% aqueous ammonia (ammonium epsilon-hydroxycaproate to ammonia in terms of mol ratio=1:5) and 39.2 g. of pure water. After substitution of the atmosphere with hydrogen, hydrogen was further supplied into the autoclave until the pressure reached 10 kg./cm.$^2$, and the content was heated and stirred. The reaction was continued for 3 hours at 340° C., and from the resultant reaction liquid 2.2 g. of crude lactam was recovered in the similar manner as in Example 1. This corresponds to a one pass yield of 32.2%.

*Example 10.*—A similar autoclave as used in Example 1 was charged with 17.1 g. of epsilon-caprolactone, 91 g. of 28% aqueous ammonia (lactone to ammonia in terms of mol ratio=1:10) and 91 g. of pure water, and the atmosphere was substituted with hydrogen. The content was heated and stirred, and the reaction was carried out for 3 hours at 400° C. From the resultant reaction liquid, 9.8 g. of crude lactam was recovered in the similar manner as in Example 1, which corresponds to a one pass yield of 57.9%. Thus obtained lactam was substantially free from colors.

*Control 3.*—A similar autoclave as used in Example 1 was charged with 17.1 g. of epsilon-caprolactone, 91 g. of 28% aqueous ammonia (lactone to ammonia in terms of mol ratio=1:10) and 91 g. of pure water. After substitution of the atmosphere with nitrogen, the content was heated and stirred. The reaction was continued for 3 hours at 390° C., and from the resultant reaction liquid 8.6 g. of crude lactam was recovered in the similar manner as in Example 1, which corresponds to a one pass yield of 50.8%. The product lactam was colored deep brown.

*Example 11.*—A similar autoclave as used in Example 1 was charged with 11.4 g. of epsilon-caprolactone, 91 g. of 28% aqueous ammonia (lactone to ammonia in terms of mol ratio=1:15). After substitution of the atmosphere with hydrogen until the pressure reached 10 kg./cm.$^2$, the content was heated and stirred. The reaction was continued for 3 hours at 340° C., and from the resultant reaction liquid 4.2 g. of crude lactam was recovered in the similar manner as in Example 1. This corresponds to a one pass yield of 37.2%. Thus obtained lactam was substantially free from colors.

*Example 12.*—A similar autoclave as used in Example 1 was charged with 17.1 g. of epsilon-caprolactone, 45.5 g. of 28% aqueous ammonia (lactone to ammonia in terms of mol ratio=1:10) and 102 g. of pure water. After substitution of the atmosphere with a gaseous mixture of hydrogen and nitrogen (mixing ratio=1:1) until the pressure reached 10 kg./cm.$^2$, the content was heated and stirred. The reaction was continued for 5 hours at 300° C., and from the resultant reaction liquid 5.2 g. of crude lactam was recovered in the similar manner as in Example 1. This corresponds to a one pass yield of 30.7%. Thus obtained lactam was considerably clean.

*Example 13.*—A similar autoclave as used in Example 1 was charged with 13.1 g. of epsilon-hydroxycaproamide and 122 g. of 14% aqueous ammonia (epsilon-hydroxycaproamide to ammonia in terms of mol ratio=1:10). After substitution of the atmosphere with hydrogen, the content was heated and stirred. The reaction was continued for 5 hours at 275° C., and from the resultant reaction liquid 1.9 g. of crude lactam was obtained in the similar manner as in Example 1. This corresponds to a one pass yield of 16.8%. Thus obtained lactam was substantially free from colors.

*Example 14.*—A similar autoclave as used in Example 1 was charged with 13.1 g. of epsilon-hydroxycaproamide and 122 g. of 14% aqueous ammonia (epsilon-hydroxycaproamide to ammonia in terms of mol ratio=1:10). After substitution of the atmosphere with hydrogen until the pressure reached 20 kg./cm.$^2$, the content was heated and stirred. The reaction was continued for 3 hours at 350° C., and from the resultant reaction liquid 2.6 g. of crude lactam was obtained in the similar manner as in Example 1. This corresponds to a one pass yield of 23.0%. The product lactam was substantially free from colors.

*Example 15.*—A similar autoclave as used in Example 1 was charged with 13.1 g. of epsilon-hydroxycaproamide and 122 g. of 14% aqueous ammonia (epsilon-hydroxycaproamide to ammonia in terms of mol ratio=1:10). After substitution of the atmosphere with nitrogen, further nitrogen was introduced thereinto until 5 kg./cm.$^2$, to which hydrogen was added until the pressure reached 10 kg./cm.$^2$, and the content was heated and stirred. The reaction was continued for 3 hours at 300° C., and from the resultant reaction liquid 2.4 g. of crude lactam was recovered in the similar manner as in Example 1. This corresponds to a one pass yield of 21.2%. Thus obtained lactam was considerably clean.

*Example 16.*—A similar autoclave as used in Example 1 was charged with 14.6 g. of methyl epsilon-hydroxycaproate, 60.7 g. of 28% aqueous ammonia (methyl epsilon-hydroxycaproate to ammonia in terms of mol ratio=1:10) and 46.3 g. of pure water. After substitution of the atmosphere with nitrogen, a gaseous mixture of hydrogen and nitrogen (the mixing ratio=1:1) was further supplied into the autoclave until the inside pressure reached 5 kg./cm.$^2$, followed by heating and stirring of the content. The reaction was continued for 8 hours at 280° C., and from the resultant reaction liquid 3.5 g. of crude lactam was recovered in the similar manner as in Example 1. This corresponds to a one pass yield of 31.0%. Thus obtained lactam was considerably clean.

*Example 17.*—A similar autoclave as used in Example 1 was charged with 21.4 g. of cyclohexyl epsilon-hydroxycaproate, 60.7 g. of 28% aqueous ammonia (cyclohexyl epsilon-hydroxycaproate to ammonia in terms of mol ratio=1:10) and 46.3 g. of pure water. After substitution of the atmosphere with hydrogen, the content was heated and stirred. The reaction was continued for 10 hours at 230° C., and 2.4 g. of crude lactam was recovered in the similar manner as in Example 1. This corresponds to a one pass yield of 21.2%. The resultant lactam was considerably clean.

*Example 18.*—A similar autoclave as used in Example 1 was charged with 11.4 g. of epsilon-caprolactone, 60.6 g. of 28% aqueous ammonia, and 60.6 g. of pure water (lactone:ammonia:water in terms of mol ratio= 1:10:57.9). After substitution of the atmosphere with hydrogen, the content was heated and stirred. The reaction was continued for 3 hours at 390° C. and the autoclave was left to cool off. Upon cooling the recation liquid was extracted with chloroform, and by the subsequent treatments as in Example 1, 6.3 g. of crude lactam was recovered therefrom, corresponding to a one pass yield of 56%. Thus obtained lactam was substantially free from colors.

To the reaction liquid remaining after the chloroform extraction, 28% aqueous ammonia was added in an amount corresponding to that which was lost during the reaction and the post-treatments. Thereupon the above-described reaction was performed twice in the similar manner, with the following results. The crude lactam thus obtained was substantially free from colors, compared with having coloration of the reaction product in nitrogen atmosphere.

| Run No. | Lactone (g.) | Lactone: ammonia (mol ratio) | Crude lactam (g.) | One pass yield (percent) |
|---|---|---|---|---|
| 1 | 11.4 | 1:10 | 6.3 | 56 |
| 2 | (5.0) | 1:23 | 2.0 | 40 |
| 3 | (3.0) | 1:38 | 0.8 | 36 |

The amount of lactone indicated in the parentheses above is the calculated value corresponding to that remaining in the reaction liquid after recovery of the lactam formed in the previous run. The total amount of crude lactam obtained from the three runs was 9.1 g., corresponding to a total yield of 80.6%.

What is claimed is:

1. A process for the production of epsilon-caprolactam, which comprises heating at least one compound selected from the group consisting of epsilon-caprolactone, epsilon-hydroxy-caproamide and amide-forming derivatives of epsilon-hydroxycaproic acid, together with aqueous ammonia whose ammonia concentration is from 8 to 35% by weight, to a temperature within the range of 200° to 420° C. in an atmosphere of hydrogen or hydrogen-containing inert gas.

2. The process of claim 1 in which the amide-forming derivative of epsilon-hydroxycaproic acid is selected from the group consisting of lower alkyl-, cycloalkyl-, aralkyl-, and aryl-esters of the said acid; epsilon-hydroxycaproic acid halides; and ammonium salt and alkali metal salts of the said acid.

3. The process of claim 1 in which the reaction is carried out in a pressure vessel under hydrogen or hydrogen-containing gaseous atmosphere at the autogenous pressure of the reaction mixture.

4. The process of claim 1 in which the hydrogen or hydrogen-containing gas is, in terms of partial pressure of hydrogen at room temperature, within the range of 0.01 to 100 atmospheres.

5. The process of claim 1 in which the hydrogen or hydrogen-containing gas is, in terms of the partial pressure of hydrogen at room temperature, within the range of 1 to 50 atmospheres.

6. The process of claim 1 in which the reaction temperature is within the range of 250–390° C.

7. The process of claim 1 in which the aqueous ammonia has a concentration of 8 to 35% by weight, and is used in such an amount that at least one compound selected from the group consisting of epsilon-caprolactone, epsilon-hydroxycaproamide and amide-forming derivatives of epsilon-hydroxycaproic acid ranges from 1:1 to 25:1.

8. The process of claim 1 in which the reaction is performed in batch system or in continuous system.

References Cited by the Examiner

UNITED STATES PATENTS

| | | | |
|---|---|---|---|
| 2,817,646 | 12/1957 | Payne | 260—239.3 |
| 2,840,553 | 6/1958 | Pieper | 260—239.3 |
| 2,840,554 | 6/1958 | Pieper | 260—239.3 |
| 3,000,877 | 9/1961 | Phillips | 260—239.3 |
| 3,000,878 | 9/1961 | Phillips | 260—239.3 |
| 3,000,879 | 9/1961 | Phillips | 260—239.3 |
| 3,000,880 | 9/1961 | Phillips | 260—239.3 |

JOHN D. RANDOLPH, *Primary Examiner.*

WALTER A. MODANCE, *Examiner.*

ROBERT T. BOND, *Assistant Examiner.*